Jan. 9, 1940.  G. A. LYON  2,186,550
ORNAMENTAL ACCESSORY FOR WHEELS
Filed Nov. 5, 1936  2 Sheets-Sheet 1
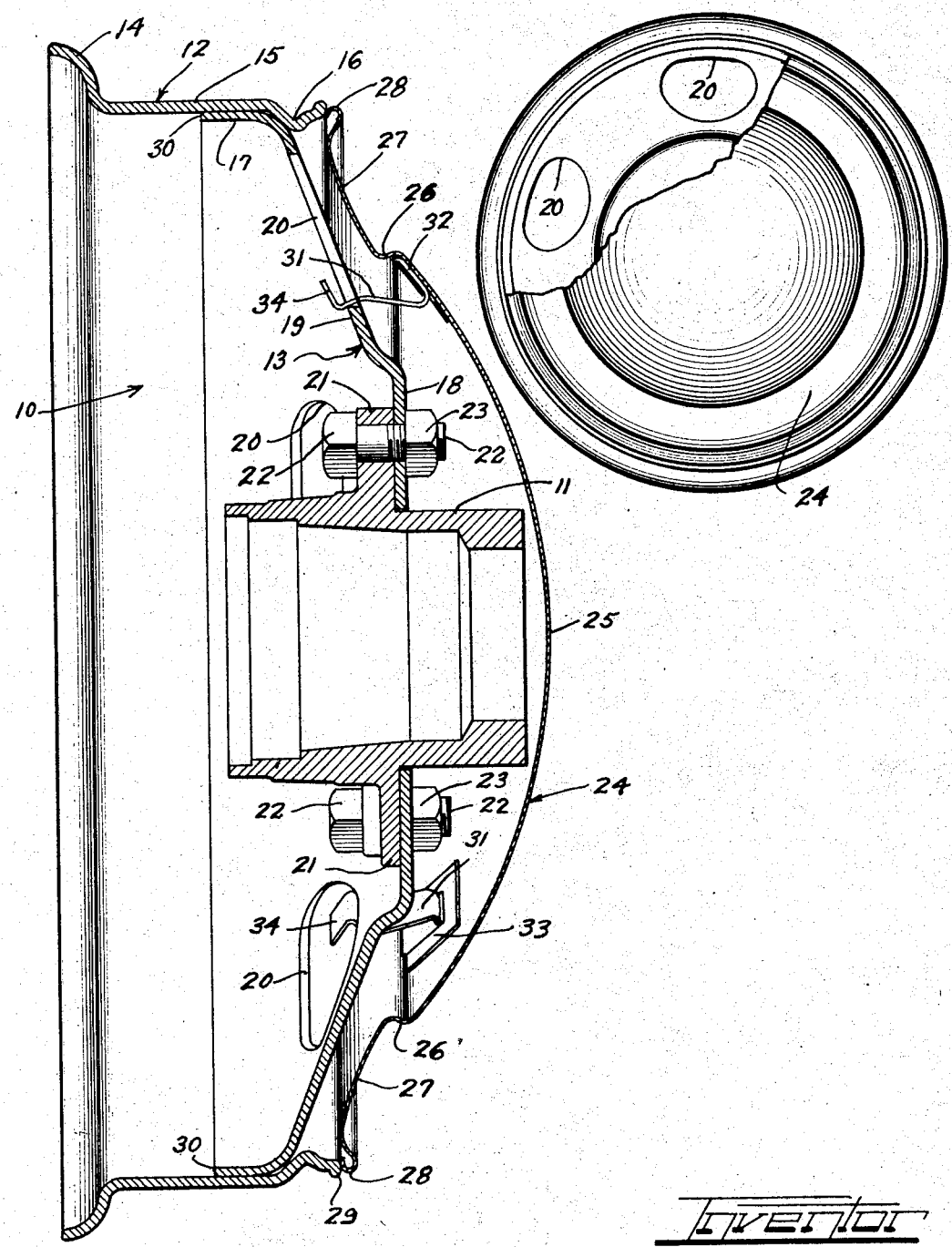
Inventor
GEORGE ALBERT LYON.

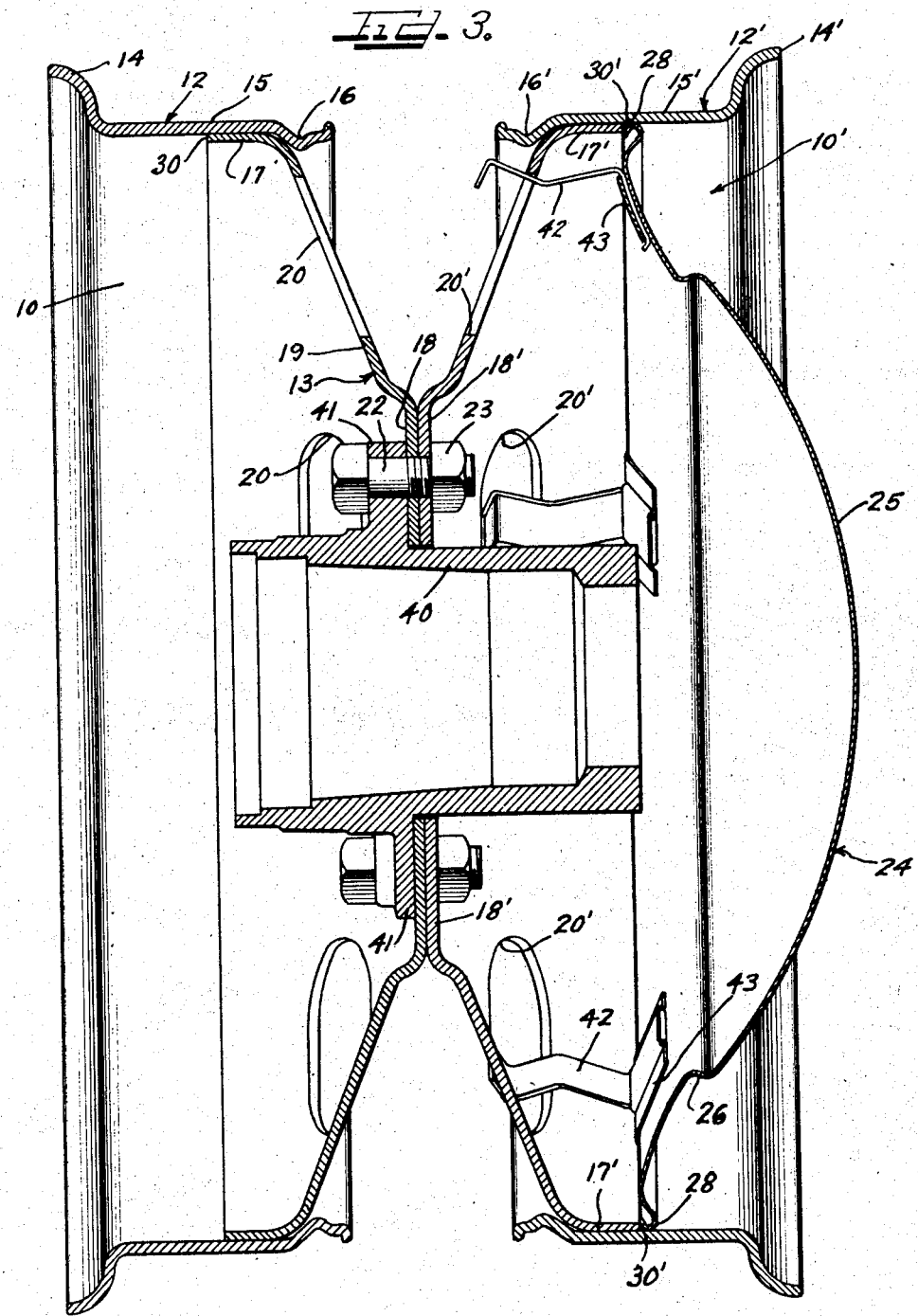

Patented Jan. 9, 1940

2,186,550

UNITED STATES PATENT OFFICE 2,186,550

ORNAMENTAL ACCESSORY FOR WHEELS

George Albert Lyon, Allenhurst, N. J.

Application November 5, 1936, Serial No. 109,252

1 Claim. (Cl. 301—37)

This invention relates to ornamental accessories for wheels, and more particularly to an ornamental accessory adapted to be mounted on either side of a wheel having a different configuration on one side than on the other side.

One type of wheel which is commonly manufactured at the present time is so constructed that it may either be mounted on a vehicle singly or it may be mounted with a similar wheel on a single hub to form a pair of wheels. This practice is particularly common in the truck manufacturing industry where the equipment of trucks depends to a large extent upon the nature of the load for which the truck is subsequently intended to be used.

Wheels of this character are usually designed with an inclned body part having a central vertically disposed fastening flange. When the wheels are mounted in pairs, the fastening flanges are adapted to be disposed in intimate contact with each other, the inclined body parts thus extending outwardly away from each other. When the wheels are arranged in this manner, it is to be noted that the side of the outer wheel remote from its fastening flange becomes the outer side of the pair. However, when only a single wheel is used, it is common to use the inner wheel only of the pair. Under these circumstances, the outer side of the wheel with reference to the vehicle, is the fastening flange side thereof.

In order to reduce manufacturing cost of ornamental members adapted for disposition over the outer side of wheels of this character, it is highly desirable that the member be so constructed that it may be mounted on either side of the wheel, depending of course on whether the wheel is to be used singly or in pairs on the vehicle. Since after the vehicle is once sold to the consumer, the character of the wheel mounting cannot be changed by reason of the fact that a different hub is required for single mountings than for double mountings, it is not necessary that a single securing means attached to the ornamental member be such as to operate under either circumstance, since there will be no subsequent changeability requirements.

It is an object of this invention to provide an ornamental accessory for wheels having the above described highly desirable characteristics.

It is a further object of this invention to provide a novel ornamental accessory for wheels which is economical to manufacture and rugged and reliable in use.

It is a still further object of this invention to provide an ornamental member adapted for disposition on either side of a wheel.

Another object of this invention is to provide a novel ornamental accessory for wheels of the type which are adapted to be used either singly or in pairs on a single hub.

Another and further object of this invention is to provide a novel ornamental side covering member for wheels of the type having a different configuration on one side than on the other.

Another and still further object of this invention is to provide a novel combination of ornamental members on wheels.

The novel features which I believe to be characteristic of my invention are set forth with particularity in the appended claim. My invention itself, however, both as to its organization and manner of construction, together with further objects and advantages thereof, may best be understood by reference to the following description taken in connection with the accompanying drawings, in which:

Figure 1 is a side elevational view partly in cross section illustrating a single wheel and an ornamental member mounted thereon;

Figure 2 is a front elevational view of the wheel and ornamental member of Figure 1 with the ornamental member partly broken away to illustrate the body part of the wheel; and Figure 3 is a side elevational view partly in cross section of a double wheel mounting on a single hub with an ornamental member disposed over the outer side of the outer wheel.

Referring now to Figures 1 and 2 of the drawings, a single wheel 10 of the type above referred to is illustrated as being mounted on a hub 11. Wheel 10 includes a rim part 12 and a body part 13. Rim 12 is of a type frequently employed by wheel manufacturers and includes a side edge 14, a base portion 15, and an annular groove 16 which is adapted to receive the usual mounting ring to complete the rim assembly. Body part 13 of wheel 10 has a laterally extending flange or portion 17 at its outer periphery and a vertically disposed fastening flange 18 centrally situated thereon. Laterally extending flange 17 is adapted to be secured to base portion 15 of rim 12 in any suitable manner such as by welding or riveting (not shown). The immediate or main portion 19 of body part 13 is inclined at a substantial angle to the vertical plane of the wheel as is clearly indicated in Figure 1 of the drawings. Main portion 19 of body part 13 is provided with an annular series of openings 20.

Hub 11 is provided with a radially extending fastening flange 21 which is adapted to have fastening flange 18 of body part 13 firmly secured thereto when wheel 10 is in its mounted position on the vehicle by means of bolts 22 and nuts 23.

An ornamental member 24 of novel design is shown as being mounted on the outer side of wheel 10. Ornamental member 24 includes a centrally disposed outwardly extending protuberance or crown-like portion 25, a relatively small substantially laterally extending intermediate portion 26 and an outer portion 27. Outer portion 27 is preferably provided with an underturned outer edge portion 28 which is adapted when mounted, as shown in Figure 1, to engage the outer edge portion 29 of rim 12 on the open side of the rim. As will presently be explained in connection with the discussion of Figure 3 of the drawings, underturned edge 28 of ornamental member 24 is also adapted to engage the outer edge 30 of laterally extending flange 17 when ornamental member 24 is mounted on the other side of wheel 10.

Ornamental member 24 is provided with a plurality of annularly disposed resilient ornamental member retaining elements 31. Resilient elements 31 have a tail portion 32 which is adapted to be secured to the underside of ornamental member 24 at substantially the junction point of protuberance 25 and substantially laterally extending portion 26 by any suitable means such as by a bracket 33 which is welded to ornamental member 24. The free end of the resilient element 31 extends substantially laterally from ornamental member 24 and is terminated in a radially outwardly extending tip portion 34. Resilient elements 31 are so disposed that they are adapted to have their outer ends snapped through openings 20 in wheel body part 13 to detachably retain ornamental member 24 in desired position on wheel 10.

Figure 3 of the drawings illustrates how ornamental member 24 is adapted to be disposed on the opposite side of the wheel from that illustrated in Figure 1, as is necessary when wheel 10 is mounted with a similar wheel 10' on a single hub 40 to form a double wheel assembly. In order that the identity of parts may be clearly kept in mind, those portions which are precisely the same as corresponding portions in Figure 1 are given the same reference numerals while those portions of the similar wheel 10' which are identical to corresponding portions on wheel 10 have been given the same reference numerals with a prime added thereto. As will readily be understood from a cursory inspection of Figure 3 of the drawings, wheel 10' is adapted to be mounted on hub 40, the fastening flange 18' of wheel 10' being disposed in intimate contact with the fastening flange 18 of wheel 10, and both flanges being firmly secured to radial extending fastening flange 41 of hub 40 by means of bolts 22 and nuts 23. It is to be noted that when two wheels of the above described type are mounted together, that is, with their respective fastening flanges disposed in intimate contact with each other, that the outer side of the outer wheel is the reverse of that which constitutes the outer side of the single wheel as illustrated in Figure 1. Ornamental member 24 is therefore presented to a different side of the wheel when wheels of this type are mounted in pairs than when they are mounted singly on a hub.

In the double wheel assembly, outer underturned edge 28 of ornamental member 24 is adapted to extend into engagement with outer edge 30' of laterally extending flange 17'. It is also to be noted that underturned edge 28 is in engagement with the under surface of base flange 15' of rim 12'.

When ornamental member 24 is adapted to be secured to the side of the wheel opposite to that of the fastening flange, it is obviously necessary that a slightly different form of ornamental member retaining element is necessary. As is clearly indicated in Figure 3, ornamental member 24 is provided with a plurality of resilient ornamental member retaining elements 42 which are substantially longer than those described in connection with Figure 1 since in this instance the openings 20' through which the resilient elements are adapted to extend are further away from the ornamental member. Resilient elements 42 may be secured to ornamental member 4 in a manner substantially equivalent to that subscribed in connection with Figure 1, such as by brackets 43 which are welded to the under surface of ornamental member 24. Since the outer edge of openings 20' is substantially nearer to ornamental member 24, than is the inner edge, it is preferable to secure resilient elements 42 in proximity to the outer edge of ornamental member 24 on the under side of portion 27. As will be observed from the drawing, outer portion 27 of ornamental member 24 is depressed inwardly. This particular configuration makes it possible to provide much shorter resilient elements than would otherwise be the case, since it brings the outer under surface of ornamental member 24 nearer the body part of the wheel. It is to be understood, however, that resilient elements 42 may be secured to the ornamental member 24 at substantially the same place as that illustrated in Figure 1, it being only necessary to provide a sufficiently long free end portion therefor to engage the inner edge of opening 20'.

From the above description, it will be seen that I have provided a novel ornamental accessory for wheels having a different configuration on one side than on the other side. The ornamental accessory may be conveniently mounted on either side of the wheel by simply varying the nature of the ornamental member retaining means which is carried by the ornamental member. By constructing an ornamental member in this manner, it will at once become apparent to those skilled in the art that manufacturing cost is substantially reduced since only one set of stamping equipment is required for making an ornamental member for use on wheel assemblies of two distinctly different types.

While I have shown a particular embodiment of my invention, it will of course be understood that I do not wish to be limited thereto since many modifications may be made, and I therefore contemplate by the appended claim to cover all such modifications as fall within the true spirit and scope of my invention.

I claim as my invention:

In combination, a wheel comprising a disc with a cylindrical flange and a rim having a cylindrical base fitting on said flange and a channel portion on the other side of said disc from said flange for receiving a removable tire retaining flange and having an inside diameter slightly smaller than the outside diameter of said cylindrical flange, the edge of said cylindrical flange and the outside of said channel portion forming annular abutments facing outward towards opposite sides of the wheel, and a round ornamental member having a diameter greater than said inside diameter of the channel portion and not greater than said outside diameter of said cylindrical flange and having means for holding it on one side of said wheel with the edge thereof against one of said abutments.

GEORGE ALBERT LYON.